(12) United States Patent
Martin

(10) Patent No.: US 7,203,786 B2
(45) Date of Patent: Apr. 10, 2007

(54) ERROR-FLAGGING APPARATUS, SYSTEMS, AND METHODS

(75) Inventor: Peter N. Martin, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 10/953,209

(22) Filed: Sep. 28, 2004

(65) Prior Publication Data

US 2006/0075153 A1    Apr. 6, 2006

(51) Int. Cl.
*G06F 13/00* (2006.01)

(52) U.S. Cl. .................... 710/302; 710/260

(58) Field of Classification Search ............. 710/260, 710/262, 301, 302
See application file for complete search history.

(56) References Cited

U.S. PATENT DOCUMENTS

| | | | |
|---|---|---|---|
| 6,012,148 A * | 1/2000 | Laberge et al. | 714/2 |
| 6,715,004 B1 * | 3/2004 | Grimsrud et al. | 710/35 |
| 6,728,668 B1 * | 4/2004 | Kitamorn et al. | 703/22 |
| 7,035,954 B1 * | 4/2006 | Duran | 710/302 |

* cited by examiner

*Primary Examiner*—Rehana Perveen
*Assistant Examiner*—Clifford Knoll
(74) *Attorney, Agent, or Firm*—Schwegman, Lundberg, Woessner & Kluth, P.A.

(57) ABSTRACT

Apparatus and systems, as well as methods and articles, may operate to monitor a flag bit to indicate an occurrence of at least one of a plurality of operational excursions associated with a peripheral card coupled to a bus controller.

24 Claims, 3 Drawing Sheets

ERROR-FLAGGING APPARATUS, SYSTEMS, AND METHODS

TECHNICAL FIELD

Various embodiments described herein relate to circuits generally, including apparatus, systems, and methods used to flag operational errors.

BACKGROUND INFORMATION

Some computers may employ a peripheral component interconnect (PCI) bus to provide data, address, and control paths between components including a microprocessor, memory, and PCI cards. PCI bus drivers, receivers, and control logic may be implemented using PCI controller circuitry. Some PCI controllers may support operation of one or more PCI buses simultaneously (e.g., PCI bridging). A PCI controller may support the insertion and removal of PCI cards while the computer is operating. This process, sometimes known as a "hot swap", may be implemented using a standard hot plug controller (SHPC). Hardware logic included in devices coupled to a PCI bus, as well as operating system and PCI card software and/or firmware drivers, may cooperatively interact during normal PCI bus operation.

During operation of the computer with one or more PCI buses, hardware logic and/or driver instructions may cause certain bus-related parameters (e.g. bus timing and/or register values) to fall outside of pre-defined normal ranges. Such "operational excursions" may impede cooperation between bus-attached devices, and may cause bus delays, improper PCI card operation, and/or operating system crashes.

For more information regarding PCI bus standards, please refer to "Conventional PCI Specification-Revision 3.0: 2004", "PCI Express 1.0a Specification", "PCI-X 2.0a Specification", "PCI Express to PCI/PCI-X Bridge Specification", and "Standard Hot Plug Controller 1.0 Specification" prepared by PCI-SIG (Special Interest Group), whose current address is 5440 SW Westgate Dr. Suite 217; Portland, Oreg. 97221.

DETAILED DESCRIPTION

Various embodiments disclosed herein may operate to flag PCI bus and/or SHPC operational excursions for purposes of diagnosis, display, and/or error-handling. In some embodiments, an error may be flagged by setting a bit in a register particular to the error. Some embodiments may differentiate between hard and soft errors, perhaps assigning a group of bits and/or a register for each category. A soft error may permit normal system operation to resume following error-flagging and/or handling; in most cases, a hard error does not.

In some embodiments, a register including error flag bits may comprise a sticky register. That is, the register contents (e.g., one or more bits) may survive a bus and/or operating system reset event. Some embodiments may permit masking, clearing, and/or disabling individual error flag bits. In some embodiments, a logical OR may be performed on individual error flag bits. The result of this activity may be to set a single selected bit, flagging the occurrence of one or more operational excursions. Some embodiments may generate an interrupt to an error handler when such a flag is set. In other embodiments, a software and/or firmware driver may monitor the state of the single error flag to detect occurrence of one or more such errors.

Figure 1:
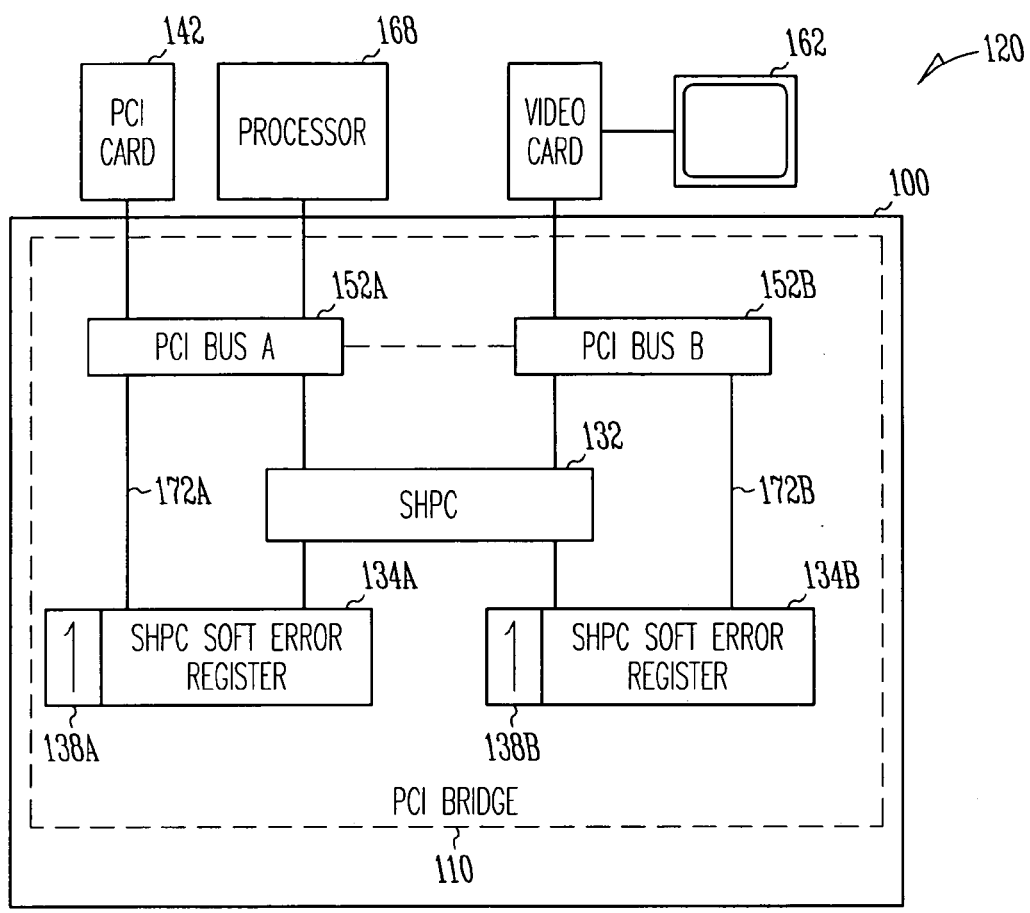
FIG. 1 comprises a diagram of an apparatus and a system according to various embodiments of the invention.

FIG. 1 is a diagram of an apparatus 100 and a system 120 according to various embodiments of the invention. For example, the apparatus 100 may comprise a controller 132 including one or more register(s) 134A, 134B having a single bit 138A, 138B to store an indication of a plurality of operational excursions associated with a PCI bridge 110 communicating with the controller 132. In some embodiments of the apparatus 100, the bits 138A, 138B may comprise sticky bits. The controller 132 may comprise an SHPC. It should be noted that in some embodiments the PCI bridge 110 and the controller 132 may comprise a single integrated circuit. It should also be noted that the register(s) 134A, 134B may be accessible by both the PCI bridge 110 and the controller 132.

In some embodiments of the apparatus 100, the PCI bridge 110 may be coupled to the controller 132 to communicate power-sequencing information, including information regarding the insertion and/or removal of a PCI card 142. It should be noted that power-sequencing information may originate at the PCI card 142, the PCI bridge 110, the controller 132, and/or at some selected hardware, software, and/or firmware driver module. As previously noted, in some embodiments of the apparatus 100 the controller 132 may comprise a portion of the PCI bridge 110. The PCI card 142 may be coupled to the PCI bridge 110 to provide the plurality of operational excursions. Other embodiments may also be realized.

For example, a system 120 may include an apparatus, similar to or identical to the apparatus 100 previously described. The system 120 may also include a PCI bridge 110 to provide at least one bus 152A, 152B, and/or at least one register 134A, 134B to couple to a controller 132 coupled to the bus 152A, 152B. The register(s) 134A, 134B may be used to store one or more bits 138A, 138B indicating a plurality of operational excursions associated with the PCI card 142.

The system 120 may further include a display 162 to couple to the bus 152A, 152B, and perhaps to display the contents of the register(s) 134A, 134B. In some embodiments, the system 120 may also include a processor 168 to couple to at least one register 134A, 134B via an interrupt request line 172A, 172B. In some embodiments of the system 120, the register 134A, 134B may comprise a first register 134A to couple to the controller 132 and to store soft errors, and a second register 134B to couple to the controller and to store hard errors. In some embodiments of the system 120, the register(s) 134A, 134B may comprise sticky registers.

The apparatus 100; system 120; controller 132; register(s) 134A, 134B; bits 138A, 138B; PCI bridge 110; PCI card 142; buses 152A, 152B; display 162; processor 168; and interrupt request lines 172A, 172B may all be characterized as "modules" herein.

Such modules may include hardware circuitry, and/or a processor and/or memory circuits, software program modules and objects, and/or firmware, and combinations thereof, as desired by the architect of the apparatus 100 and system 120, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to simulate the operation of various potential embodiments.

It should also be understood that the apparatus and systems of various embodiments can be used in applications other than SHPC error-flagging implementations, and thus various embodiments are not to be so limited. The illustrations of apparatus 100 and system 120 are intended to provide a general understanding of the structure of various embodiments, and they are not intended to serve as a complete description of all the elements and features of apparatus and systems that might make use of the structures described herein.

Although some embodiments of the inventive subject matter have been disclosed as being implemented in the environment of a peripheral component interconnect (PCI) bus, PCI controllers, PCI cards, and PCI bridges, other types of known or future buses, bus controllers, peripheral cards, and peripheral-supporting architecture may be substituted. Similarly, the inventive subject matter may encompass other known and future bus controllers, including hot plug controllers, in addition to an SHPC.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments may include a number of methods.

Figure 2:
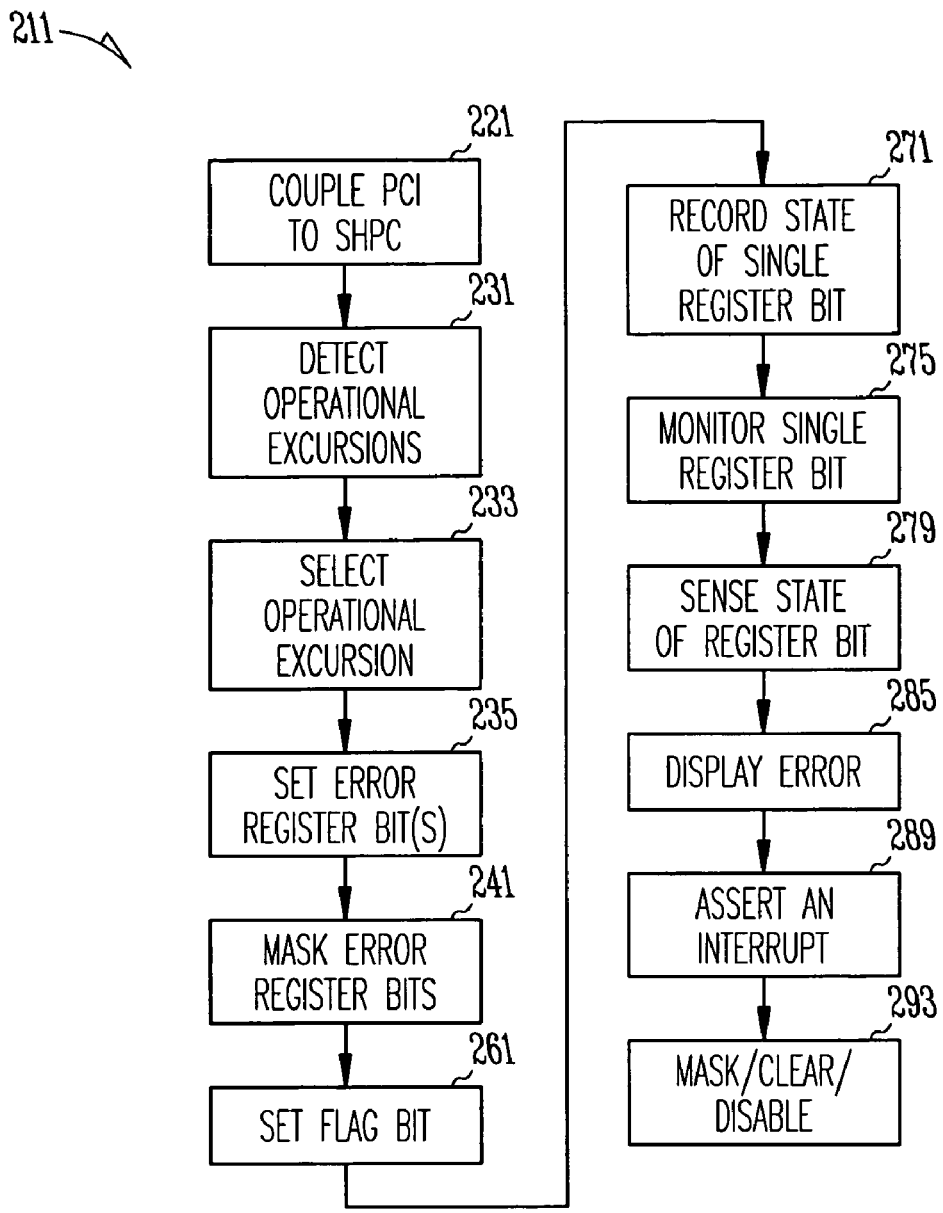
FIG. 2 comprises a flow diagram illustrating several methods according to various embodiments of the invention.

FIG. 2 is a flow diagram illustrating several methods 211 according to various embodiments of the invention. Thus, a method 211 may (optionally) begin at block 221 with coupling a PCI card to an SHPC. The method 211 may continue with detecting a plurality of operational excursions associated with the PCI card capable of being coupled to the SHPC at block 231, and/or selecting a single operational excursion from the plurality of operational excursions at block 233. The method 211 may include setting one or more error bits in a register associated with at least one operational excursion of a plurality of operational excursions, perhaps with each bit representing the occurrence of one or more selected types of operational excursions, as applicable, at block 235.

The method 211 may further include masking the plurality of bits at block 241 and/or setting a flag bit at block 261, to indicate the occurrence of at least one operational excursion selected from the plurality of operational excursions. It should be noted that the flag bit may, in some embodiments, comprise a result of a logical OR operation performed on the plurality of bits. It should also be noted that the method 211 may be performed at any point during the operation of a PCI card.

Thus, the method 211 may also include recording a state of a single flag bit during one of a power-up sequence, a power-down sequence, and a selected operational time period of the PCI card at block 271. The method 211 may continue with monitoring the single flag bit to determine an occurrence of a plurality of operational excursions associated with the PCI card coupled to an SHPC at block 275. It should be noted that the single flag bit may have a state indicating either a soft error or hard error, or both.

In some embodiments, the method 211 may include sensing a state of a flag bit indicating the flag bit has been set at block 279, displaying a soft and/or hard error condition at block 285, and/or asserting an interrupt upon detecting the state indicating the error at block 289. In some embodiments, the interrupt may comprise a system interrupt. The method 211 may (optionally) conclude by selectively masking, clearing, and/or disabling the plurality of bits at block 293.

It should be noted that the methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 3:
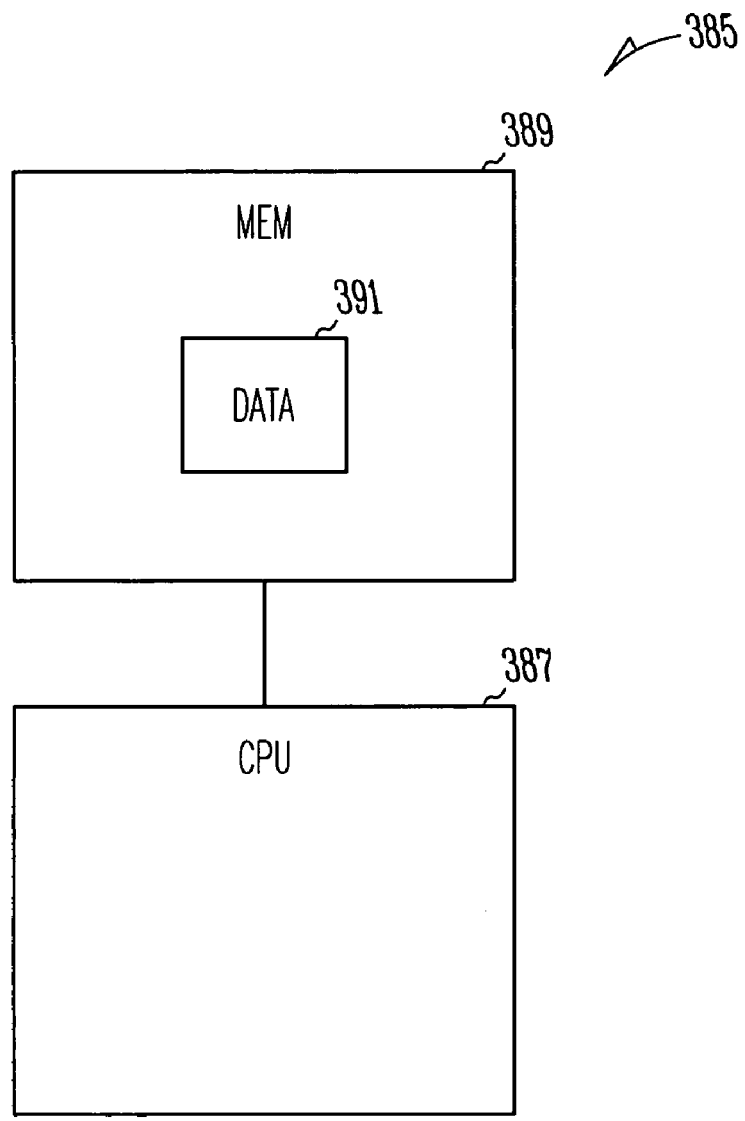
FIG. 3 comprises a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, and/or any type of electronic device or system. The article 385 may include a processor 387 coupled to a machine-accessible medium such as a memory 389 (e.g., a memory including an electrical, optical, or electromagnetic conductor) having associated information 391 (e.g., computer program instructions and/or data) which, when accessed, results in a machine (e.g., the processor 387) performing such actions as detecting a plurality of operational excursions associated with a peripheral card capable of being coupled to a bus controller. In some embodiments of the article 385, the peripheral card may comprise a PCI card and/or the bus controller may comprise an SHPC.

Other activities may include, for example, setting a plurality of bits in a register associated with the plurality of operational excursions, masking the plurality of bits to flag at least one operational excursion, and setting a flag bit of the register to indicate the operational excursion. It should be noted that a state of the flag bit may include a result of a logical OR operation performed on the plurality of bits. Some activities may include selectively masking, clearing, and/or disabling the plurality of bits.

Implementing the apparatus, systems, and/or methods disclosed herein may enhance the diagnosis of abnormal operations associated with a PCI card coupled to a bus controller, including an SHPC.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, including:
monitoring a single sticky flag bit in a hardware register embedded in a hot plug controller (HPC) to determine an occurrence of at least one operational excursion associated with a peripheral interface card (PIC) to be coupled to the HPC.

2. The method of claim 1, wherein a state of the single sticky flag bit indicates at least one of a hard error or a soft error.

3. The method of claim 2, further including:
asserting an interrupt upon detecting the state of the single sticky flag bit indicating the at least one of a hard error or a soft error.

4. The method of claim 1, further including:
recording a state of the single sticky flag bit during one of a power-up sequence, a power-down sequence, and a selected operational time period of the PIC.

5. The method of claim 1, further including:
detecting the at least one operational excursion associated with the PIC: and
setting the single sticky flag bit in the hardware register embedded in the HPC wherein the single sticky flag bit in the hardware register embedded in the HPC is selected from a plurality of bits in the hardware register embedded in the HPC, and wherein the hardware register embedded in the HPC is associated with the occurrence of the at least one operational excursion associated with the PIC.

6. The method of claim 1, further comprising:
coupling the PIC to the HPC.

7. The method of claim 5, performed during a power-up sequence associated with the PIC.

8. The method of claim 5, further including:
sensing a state of the single sticky flag bit.

9. The method of claim 5, further including:
masking the plurality of bits to flag the at least one operational excursion associated with the PIC.

10. The method of claim 2 further including:
displaying at least one of a soft error condition or a hard error condition upon detecting the at least one of a hard error or a soft error.

11. An apparatus, including:
a controller including a hardware register, wherein the hardware register comprises a single sticky bit to store an indication of at least one operational excursion associated with a peripheral interface card (PIC) bridge communicatively coupled to controller.

12. The apparatus of claim 11, wherein the controller comprises a standard hot plug controller.

13. The apparatus of claim 11, wherein the PIC bridge comprises a peripheral component interconnect (PCI) bridge.

14. The apparatus of claim 11, wherein the controller is included in the PIC bridge.

15. The apparatus of claim 13, further including:
a PCI card to couple to the PCI bridge to provide the at least one operational excursion.

16. A system, including:
a peripheral component interconnect bridge to provide a bus;
a controller communicatively coupled to the bus:
at least one hardware register coupled to the controller to store a sticky bit, wherein the sticky bit indicates a at least one operational excursion associated with the bus; and
a display to couple to the bus to display a content of the at least one hardware register.

17. The system of claim 16, further including:
a processor to couple to the at least one hardware register via an interrupt request line.

18. The system of claim 16, wherein the at least one hardware register comprises:
a first hardware register to couple to the controller to store soft errors; and
a second hardware register to couple to the controller to store hard errors.

19. The system of claim 16, wherein the at least one hardware register comprises a sticky register.

20. An article including a to machine-accessible storage medium having associated information, wherein the information, when accessed, results in a machine performing:
detecting a plurality of operational excursions associated with a peripheral component interconnect card capable of being coupled to a standard hot plug controller;

setting a plurality of sticky bits in a hardware register, the plurality of sticky bits associated with the plurality of operational excursions;

masking the plurality of sticky bits to flag at least one operational excursion selected from the plurality of operational excursions; and setting a sticky flag bit of the hardware register to flag the at least one operational excursion selected from the plurality of operational excursions.

21. The article of claim 20, wherein the information, when accessed, results in a machine performing:

selectively masking, clearing, and disabling the plurality of sticky bits.

22. The article of claim 20, wherein a state of the sticky flag bit comprises a result of a logical OR operation performed on the plurality of sticky bits.

23. The method of claim 1, wherein the PIC comprises a peripheral component interconnect (PCI) card.

24. The method of claim 1, wherein the HPC comprises a standard hot plug controller (SHPC).

* * * * *

UNITED STATES PATENT AND TRADEMARK OFFICE
CERTIFICATE OF CORRECTION

PATENT NO. : 7,203,786 B2
APPLICATION NO. : 10/953209
DATED : April 10, 2007
INVENTOR(S) : Martin It is certified that error appears in the above-identified patent and that said Letters Patent is hereby corrected as shown below:

In column 6, line 3, in Claim 5, after "PIC" delete ":" and insert -- ; --, therefor.

In column 6, line 5, in Claim 5, after "HPC" insert -- , --.

In column 6, line 21, in Claim 10, after "Claim 2" insert -- , --.

In column 6, line 30, in Claim 11, after "to" insert -- the --.

In column 6, line 44, in Claim 16, after "bus" delete ":" and insert -- ; --, therefor.

In column 6, line 46, in Claim 16, after "indicates" delete "a".

In column 6, line 62, in Claim 20, after "a" delete "to".

Signed and Sealed this

Seventh Day of August, 2007

JON W. DUDAS
*Director of the United States Patent and Trademark Office*